United States Patent [19]
Rizzieri

[11] Patent Number: 5,806,285
[45] Date of Patent: Sep. 15, 1998

[54] PROCESS AND PACKAGING PLANT FOR PACKAGING STICKY SUBSTANCES IN THE FLUID STATE

[75] Inventor: Giorgio Rizzieri, Milanese, Italy

[73] Assignee: Sav. Ind. S.r.l., Milan, Italy

[21] Appl. No.: 849,477

[22] PCT Filed: Dec. 14, 1995

[86] PCT No.: PCT/EP95/04945

§ 371 Date: Jun. 13, 1997

§ 102(e) Date: Jun. 13, 1997

[87] PCT Pub. No.: WO96/18543

PCT Pub. Date: Jun. 20, 1996

[30] Foreign Application Priority Data

Dec. 16, 1994 [IT] Italy .................................. MI94A2548

[51] Int. Cl.[6] .................................................. B65B 63/08
[52] U.S. Cl. .............................. 53/453; 53/559; 53/122; 53/127; 53/440
[58] Field of Search ..................... 264/255, 553, 264/571; 53/122, 127, 175, 428, 440, 449, 453, 559

[56] References Cited

U.S. PATENT DOCUMENTS

| | | |
|---|---|---|
| 2,328,798 | 9/1943 | Gardner . |
| 2,639,808 | 5/1953 | Barry et al. . |
| 2,762,504 | 9/1956 | Sparks et al. . |
| 3,314,536 | 4/1967 | Janota et al. . |
| 3,837,778 | 9/1974 | Parker . |
| 3,953,273 | 4/1976 | Faller . |
| 3,958,395 | 5/1976 | Reading . |
| 4,137,692 | 2/1979 | Levy . |
| 4,200,481 | 4/1980 | Faller . |
| 4,748,796 | 6/1988 | Viel . |
| 5,160,686 | 11/1992 | Thaler et al. . |
| 5,257,491 | 11/1993 | Rouver et al. . |
| 5,401,455 | 3/1995 | Hatfield et al. . |
| 5,715,654 | 2/1998 | Taylor et al. . |

FOREIGN PATENT DOCUMENTS

| | | |
|---|---|---|
| 36 38 832 | 5/1988 | Germany . |
| 42 05 919 | 9/1993 | Germany . |
| WO 93/23224 | 11/1993 | WIPO . |

*Primary Examiner*—Daniel Moon
*Attorney, Agent, or Firm*—Young & Thompson

[57] ABSTRACT

Process and plant for packaging in the fluid state substances which are sticky or soft at room or handling temperature, wherein the substance (A) is cast in a mould (1) provided with holes and lined, by means of vacuum thermoforming, with a thin film of plastic material (4) which is non-sticky at the room temperature and compatible, in the fluid state, with the sticky or soft substance (stage I). The free-surface of this substance thus formed is cooled (stage II) and finally covered with a non-sticky material (25) which is then heat-sealed with the film (stage III). The sealed materials are finally cut in the region of the sealed joint (stage IV).

37 Claims, 3 Drawing Sheets

PROCESS AND PACKAGING PLANT FOR PACKAGING STICKY SUBSTANCES IN THE FLUID STATE

The present invention relates to a process for packaging, in the fluid state, sticky substances which are sticky or soft at the room or handling temperature, and in particular to adhesives and sealants which are solid or semisolid and sticky at the room or handling temperature and which are applied, in the melted state, at temperatures higher than the room temperature, hereinbelow referred to in short as HMPSA (Hot Melt Pressure Sensitive Adhesives) or simply adhesives. The invention also relates to a preferred packaging plant in which said process is implemented. The process and the plant according to the present invention are obviously not limited to the specific products mentioned above, but are also applicable, with the identical advantages, for the packaging in the fluid state of other types of substances which are soft or sticky, or are simply contaminating, at the room or handling temperature, such as for example food mixtures or products, detergent products and cosmetics and the like. In the description which follows, reference will be made exclusively, for the sake of simplicity, to adhesive products alone.

Adhesive products are marketed in portions of varying size, which are used by introducing them directly into special melting devices in which the adhesive liquefies and can be easily applied to the desired article, on which it solidifies as soon as its temperature falls below the melting temperature. Obviously the abovementioned portions of adhesive are very sticky, both in the liquid state and in the solid or semisolid state, and must therefore be suitably packaged so as to allow easy handling thereof without causing problems of stickiness or soiling for the operators, and contamination of the product with the packaging material which remains stuck to it.

According to the most well-established prior art, packaging of the portions of adhesive is performed by casting the said portions, in the melted state, inside suitable containers (cartons, boxes, drums, etc.) made of silicone-lined plastic, cardboard or paper which, after a suitable cooling period, are stacked and packed ready for despatch.

This prior art, however, has some major drawbacks. Firstly, the silicone-lined containers represent an additional cost which is not insignificant for the manufacturer; secondly, the duration of the packaging process is excessively long, in particular owing to the long cooling times which are necessary before the adhesive is solid enough to be transported; finally, the user has the drawbacks of the time which is lost in order to unpack each portion of adhesive, a large quantity of empty packages to be disposed of and finally the danger of contamination of the product in the event of difficulty in separating the packaging material from it.

The abovementioned process is therefore being abandoned by many manufacturers in this sector who, in response to users' requirements, have developed packaging systems which no longer require the elimination of the package itself prior to use of the adhesive. This new type of package consists of a thermoplastic material having a chemical composition compatible with that of the packaged adhesive substance and which therefore does not contaminate, or contaminates only partially and to an acceptable degree, the adhesive substance itself once it is melted inside the melting device by the user and which, moreover, is not sticky at the handling temperature, in particular at the room temperature, making it possible to use external packaging which is cheaper or, even better, of the returnable type.

This intuition has provided the stimulus for the development of a very large number of processes which greatly differ not only on account of the chemical composition of the packaging layer but also on account of the procedures for applying said packaging layer to the portion of adhesive, both with regard to the original physical form of the protective coating and with respect to the method and the moment of application during the process for packaging of the portions of adhesive.

These known processes, which are all characterized by the fact that the packaged portion of adhesive can be used as such, i.e. without prior elimination of the packaging material, include the following:

A process in which the adhesive is allowed to solidify in the mould and is then packaged in a film of non-adhesive material, for example described in DE-A3625358. This process requires long storage times between the adhesive casting stage and the packaging stage and also involves handling of the blocks of adhesive which are not covered—handling which is always the source of problems.

A process in which the adhesive is melted into blocks which are subsequently coated with a material in the form of a powder which is non-adhesive at the room temperature, described for example in EP-A-531927, or a similar process in which the adhesive is cast into moulds which have been lined beforehand with a similar material in dust form, described for example in IT-A-1199078 and IT-A-1229051. The adhesives which can be treated using this process are substantially only those which at the handling or storage temperature have a good dimensional stability. Otherwise the product flows internally, causing deformation of the portion and formation of cracks in the protective coating, through which the adhesive comes into contact with the exterior.

A process in which the adhesive is cast in moulds which have been lined beforehand with a solid non-adhesive substance applied to the mould by means of a spraying system, as in EP-A-258086, or by means of a multiple-pass stranding system, as in EP-A-452186, or finally with a curtain-coating system, as in FR-A-2601616. This consists of a fairly complex and costly process which requires constant monitoring to ensure with certainty that the entire surface of the mould has been perfectly lined, and which is unable to produce low-thickness coatings. It is therefore a process involving a high level of contamination of the adhesive, which is particularly damaging when applied to the packaging of adhesives with a low dimensional stability requiring coverings of even greater thickness to avoid deformation of the portions.

A process in which the adhesive is extruded in the form of a continuous bar, which has applied around it a solid covering layer consisting of a film of non-adhesive material, as for example in DE-A-3138222 or DE-A-3234065, or a coating initially in the liquid phase consisting of a substance which is non-adhesive at room temperature, as for example in DE-A-3327289. These are processes requiring plants which are fairly expensive and delicate to run. They have moreover the considerable drawback that they produce a continuous bar which must then be cut into portions, the ends of which again pose the problem of stickiness and hence the need for a separate covering operation. Moreover, when this process is used to package deformable products, they may leak, in particular at summer temperatures, through the non-sealed ends of the various portions, thus emerging from the covering film.

A process in which the adhesive is co-extruded in a cooling liquid inside a cylindrical film of non-adhesive material and, prior to emerging from the cooling bath, is compressed and cut at regular intervals so as to provide typical cushion-shaped packs, as described in the patent EP-A-469564. This consists of a process which has been widely used owing to the ease which with it can be implemented, but it is far from being able to resolve satsfactorily the problem of packaging adhesives. In order for this process to be effective it is in fact necessary for the extruded bar of adhesive to solidify rapidly inside the cooling bath and it must therefore have relatively small dimensions. This involves consequently a high surface-area/volume ratio of the individual cushions thus formed and hence a high degree of contamination of the adhesives by the covering materials. Moreover, the adhesives which, at room temperature, retain a certain degree of fluidity tend to seep through the joints, thus giving rise again to the problem of stickiness. The same patent attempts to overcome this problem by proposing the idea of grouping together in batches the individual cushions inside a second wrapping of larger dimensions, with the negative consequence of further increasing the quantative ratio of packaging material and adhesive in the end product.

Finally, processes have been proposed, wherein a film of non-adhesive plastic material is spread over moulds and adhesive is then cast inside said moulds. The patent DE-A-4205919 describes for example a mould which can be opened and which is covered with a lining sheet when it is in the open position where the mould is lying in one plane, and is then closed, filled with adhesive and finally covered with an upper film The patent WO 93/23224 describes a similar process involving a closed mould, in which the individual blocks of adhesive material are subsequently superimposed in pairs, resulting in mating of the single faces which are not covered by the non-adhesive material.

The latter two aforementioned patents represent the prior art which is closest to the present invention, whose aim is precisely of overcoming the main drawbacks associated with this prior art, which hitherto prevented the industrial application thereof. In both these patents, in fact, no information is provided on the methods for lining the moulds with the non-adhesive film and in particular no teaching is provided as to the fact that this lining must be provided so that the film of non-adhesive material adheres perfectly to the three-dimensional surface of the mould, nor, as an obvious consequence, is any system suggested for achieving this result.

In fact, once it has been established that the non-adhesive film must be made to adhere closely to the surface of the mould—according to a first important idea of the inventor of the present invention—it is still necessary to resolve the technological problem of achieving this result in an efficient, simple, safe, quick and repeatable manner. This problem is in fact particularly difficult to overcome, not only in the case of a rigid mould, as described in the patent WO 93/23224, but also in the case of a mould which can be opened, as described in the patent DE-A-4205919, in which it is fairly difficult to make sure that the film adheres correctly to the surface of the mould during the operation involving closing of the mould itself from the planar position into the three-dimensional position. It is necessary, in fact, to emphasize how the slightest irregularity during application of the covering film onto the mould, and likewise the presence of any folds or air pockets results in the immediate breakage or melting of the. covering film itself as a result of the mechanical or thermal action of the jet of adhesive which is cast into the mould, making the individual block unusable and unduly hampering the processing of the successive blocks owing to the need to perform cleaning of the moulds contaminated by the adhesives leaking from said broken areas.

Obviously the aforementioned problem could be solved in a relatively easy manner using very thick covering films or films based on plastic materials with a high melting point or with a particular configuration of the polymer chains or the crystal lattice such they have a high mechanical strength even when of limited thickness. The use of films of the two aforementioned types would be, however, in both cases, entirely counter-productive during use of the portion of adhesive, either owing to the greater quantitative contamination caused by the high-thickness films—except in the case of films specifically formulated for each type of adhesive, so as not to alter their composition when they are melted together therewith—or owing to the greater qualitative contamination caused by the low-thickness films which are of a chemical composition quite different from the adhesive, and finally owing to the difficulties which both these types of film have in melting in a uniform manner inside the mass of adhesive at the time of use. In an attempt to minimise these drawbacks, in the packaging processes of the prior art it is usually proposed to perform cooling of the moulds or of the covering film by using cooling liquids or the like. This technique, however, is unable to provide completely satisfactory results, involves a considerable complexity in the design of the plant and above all a marked increase in energy costs.

The inventor, therefore, with the state of the art being such, has therefore set himself the aim of developing a new process for the packaging of adhesives which is able to overcome the various drawbacks of the known processes considered above, but which includes the positive aspects thereof, so as to be able to offer a process which is able to produce—with a high productivity/plant cost ratio and also with low operating and energy costs—constant volume or weight portions of HMPSA adhesives of all types (for example adhesives which are very viscous in the melted state or adhesives very deformable at the storage temperature) hermetically packaged in a non-adhesive material with a low melting point, consisting of a film of very limited thickness, so as to reduce to negligible values contamination of the adhesive in the melted state, even in the case of small-size portions, according to a characteristic feature which is increasingly requested and valued by the market, and moreover so as to render extremely easy co-fusion thereof with the adhesive, while eliminating entirely any possibility of mechanical breakages or tears as a result of melting of said film during casting of the adhesive in the mould.

The aforementioned aims have been achieved, according to the present invention, by means of a process for packaging in the fluid state adhesive substances, which are sticky at room or handling temperature, wherein the substance is cast in a tray-mould lined beforehand with a film of plastic material which is non-sticky at the room temperature and compatible in the fluid state with the substance itself, comprising the following stages:

providing at least one mould for casting the substance in the fluid state, having a plurality of through-holes passing through at least part of its walls;

rapidly lining the internal walls of said mould with a first thin and easy deformable film of said non-sticky plastic material, causing it to adhere perfectly to the walls of the mould by means of a vacuum exerted on the outside of the mould or pressure on the inside thereof;

introducing, under pressure and with a gentle flow into the mould thus lined, a predetermined quantity of substance in the fluid state, without performing any cooling of the mould;

allowing cooling of the free surface of the cast substance, until stabilisation of said surface is obtained;

covering the filled mould with a non-sticky material compatible in the fluid state with the substance;

bonding said non-sticky material to said film.

According to a preferred characteristic feature of the invention, said film of non-sticky plastic material is heated until it acquires the required degree of deformability prior to application of the vacuum or pressure thereon.

In a first preferred embodiment of the present invention, said non-sticky material consists in a second film of non-sticky plastic material, and said process comprises the following additional stages:

heat-sealing said first and said second film at the edges of the mould;

cutting the sealed films in the sealing zone;

extracting the portion of adhesive thus packaged and storing it until it has completely cooled.

In a second embodiment of the present invention, said non-sticky material consists in a second portion of partially coated adhesive, as obtained at the end of stabilization of its free surface, arranged on the first portion so as to superimpose the respective free surfaces, after extracting from the mould, where necessary, one of said portions, and said process comprises the following additional stages:

heat-sealing the films of said pair of superimposed portions along the peripheral line of the facing free surfaces thereof;

cutting the sealed films in the sealing zone;

extracting from the mould the double portion of adhesive thus packaged and storing it until it has cooled completely.

The process according to the present invention will now be illustrated in more detail with reference to a particular method of execution thereof in a packaging plant implementing the principles thereof—a plant which is illustrated in the accompanying drawings, in which.

Figure 1:
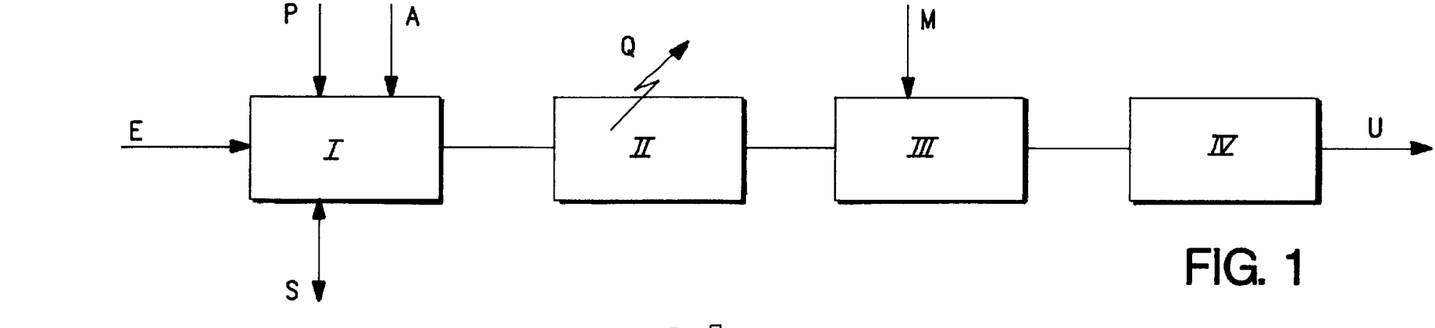
FIG. 1 is a block diagram illustrating the essential stages of the process according to the present invention.

With reference to FIG. 1, the packaging plant which implements the packaging process according to the present invention is a continuous plant which uses rigid tray-moulds 1 moved along the plant by a conveying system 2, through four work stations indicated by progressive Roman numerals. The movement of the conveying system 2 occurs in successive steps, with pauses being programmed between each step, said pauses being of a sufficient duration to allow the necessary operations to be carried out, in accordance with the process, in the various work stations arranged at intervals along the conveying system 2.

In particular the process according to the present invention comprises a first station I provided with an entrance E into which the empty moulds 1 with partially holed walls are fed. The internal walls of the moulds 1 are then lined with a deformable film P of non-sticky material which is made to adhere to them with great rapidity and precision by connecting the interior or the exterior of the mould to a pressure source S or vacuum source, respectively. The moulds 1 thus lined are then filled with the adhesive to be packaged A, which is cast into the mould in accurately predetermined quantities, without performing any cooling of the mould.

In the next station II, the free surface of the adhesive cast therein, is allowed to cool naturally, with elimination of a quantity of heat Q, until a sufficient degree of stabilization of this surface is obtained. In station III, said free surface is covered with a non-sticky material M, and said film lining the internal walls of the mould is bonded to said non-sticky material M at the edges of the mould, preferably using a thermal device. The film and the material bonded in stage III are trimmed in station IV and finally, at the exit U of this station, the packaged adhesive is removed and partially cooled and conveyed towards the storage area where complete cooling thereof is performed. The various operations referred to above will now be described in more detail, with reference to a preferred embodiment of the packaging plant.

According to the present invention, the tray-moulds 1 can be made both of metallic and plastic materials and can have a negligible thermal mass. In the experimental tests carried out by the Applicant it has in fact been possible to establish that the speed of cooling of the adhesive cast therein is substantially conditioned by the very low coefficient of heat conductivity precisely of the adhesives themselves; in other words, independently of the material used and its thickness, the heat which the mould is able to transmit and dispose of naturally outside is always greater than that which the adhesive itself is able to transmit to the walls of the mould. With an ordinary internal air-conditioning system of the environment where the plant is located, under no circumstances does therefore the mould heat up to the temperature of the melted adhesive. For the abovementioned reasons, the moulds 1 are advantageously made with materials having a low thickness, i.e. that strictly necessary to ensure good mechanical strength of the moulds during each stage of the process, with all the consequent advantages from the point of view of cost and ease of manufacture thereof. Preferably the moulds 1 will therefore have walls having a thickness not greater than 5 mm and even more preferably not greater than 3 mm.

If it is wished to use, according to the aim of the present invention, covering films which are of limited thickness and can be easily dissolved in the melted adhesive, it is instead essential that special care should be taken in the design of the internal surface of the mould, in accordance with the information supplied below. In a preferred method of execution of the process according to the invention in fact, lining of the internal walls of the mould with the first film of non-sticky plastic material is performed by means of a vacuum thermoforming process, i.e. by heating said film to the desired degree of deformability and then making it rapidly adhere to the walls of the mould by means of a vacuum created inside the mould itself via a series of through-holes formed in the walls of the mould and connected up on each occasion to a vacuum source outside the mould. Alternatively, however, a source of pressure applied inside the mould 1 can be used for the same purpose.

So that the covering layer thus obtained is really effective, it is indispensable, on the one hand, that it should not give rise to flaws or tears during the application process and, on the other hand, that the covering layer should adhere perfectly—i.e. without any air pockets or folds—to the walls of the mould. If this latter condition is in fact not satisfied, the introduction of the high-temperature melted adhesive material could result in melting and hence tearing of the covering layer, in those areas where it is not in close contact with the mould and hence mechanically supported by the latter.

This latter circumstance is particularly important:

the Applicant has in fact been able to establish, during the numerous experimental tests carried out by the same, that during the introduction of the melted adhesive material the film lining the mould is almost entirely melted, but, in the presence of the continuous and stable support provided by the mould and moreover of a gentle injection flow, there is no mixing between the melted adhesive and the material of the covering film (despite the fact that the latter is partially or completely melted), such that the latter, once cooling has taken place, nevertheless forms a continuous external non-sticky surface of the packaged portion of melted adhesive.

Another important requirement of the thermoforming operation is that of homogeneous stretching of the film. In other words it is necessary that the inevitable thinning of the film following deformation thereof during the thermoforming operation should occur in an as homogeneous as possible manner, so that there are no zones of the film with a final thickness which is insufficient to withstand the thermal and mechanical shock due to filling of the mould with the melted adhesive. The most critical zones of the mould from this point of view are obviously the corner zones where deformation of the film reaches its highest values.

It is moreover necessary to prevent the film from sagging too much, during the heating stage, and touching the surface of the mould before the start of the thermoforming stage. In this case, in fact, the film would be subject to a sudden cooling action with the formation of folds on the edge of the mould, which it would be difficult to eliminate, said folds adversely affecting the subsequent operation of bonding with the non-sticky material M in station III.

These precautions obviously would not be necessary if use were made of covering films which are thicker or have a higher melting temperature or also a particular configuration of the polymer chains or the crystal lattice so as to provide them with a high mechanical strength or lastly—even though the outcome would be less certain—if the covering film were constantly maintained at a low temperature; it has already been seen, however, how such types of covering film cause unacceptably high contamination of the adhesive product at the moment of use and hence are not popular with the market.

The design of the mould and in particular of its internal surface is therefore a particularly delicate affair. The mould must in fact have a set of small holes uniformly and closely arranged on its bottom wall and preferably also on at least a part of its side walls, it must not have any sharp edges, i.e. all the walls must be connected together with sufficiently wide radii of curvature, and finally it must have a depth which is carefully calculated with respect to the other two transverse dimensions of the mould. In a preferred embodiment, the mould is a metal mould—preferably treated on its surface with an anti-adhesive material—having a square shape and its depth is preferably greater than $\frac{1}{5}$th of the side of the square in order to optimise the number of moulds necessary for a given production capacity and in order to keep sufficiently low the area/volume ratio of the individual portions of adhesive, with all the consequent advantages of reduced contamination of the adhesive itself by the packaging material, during use of the adhesive. This depth must not, however, preferably exceed the value of $\frac{1}{3}$rd of the side of the square, so as to avoid the covering film being excessively deformed during the lining operation, with the result that its uniformity cannot be properly controlled. In the case where rectangular moulds are used, the aforementioned maximum values for the depth are understood as referring to the smaller side of the mould. With such measures it is possible to use, without problems, films with very limited thicknesses, for example less than 60 $\mu$m and preferably less than 40 $\mu$m, and having moreover such a composition that can be rapidly dissolved in melted HMPSA.

This latter parameter, i.e. the "rapid dissolvability", represents an increasingly important indicator during the overall assessment of the quality of the packaging material used, since it characterizes the behaviour of said material precisely during the conditions of use. For an objective assessment of this parameter, use is made of a particular trial method, described for example in EP-A-557573, according to which the film material, the "rapid dissolvability" of which is to be tested, is arranged in predetermined quantitative ratios, on the free surface of test trays filled with an adhesive reference substance. The trays thus prepared are placed in an oven at 150° C. for two hours and the "rapid dissolvability" of each sample is assessed by checking for the presence of traces of undissolved film, immediately after agitating the assembly a predetermined and limited number of times.

Figure 2:
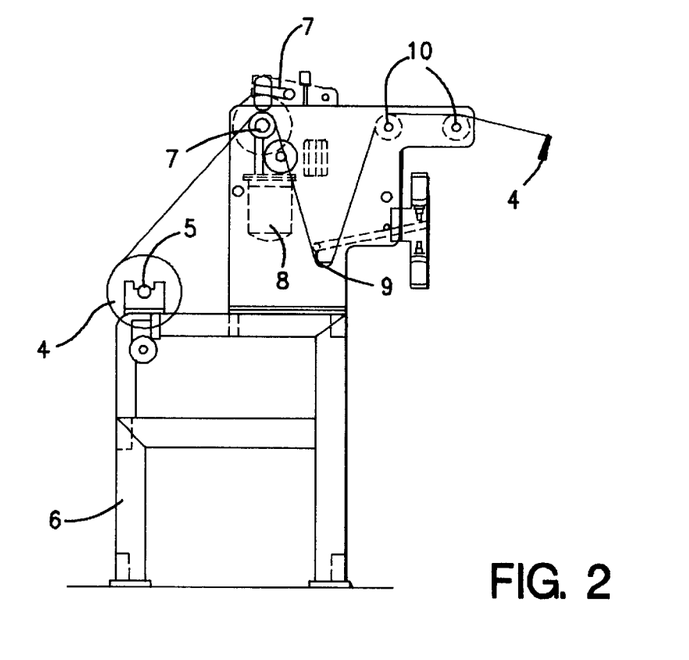
FIG. 2 is a side elevation view illustrating the device for feeding the first covering film.

As has been seen, the first operation which is performed in the process of the present invention is the formation of a lining on the internal walls of the moulds 1 with a first film 4 of non-sticky plastic material. As can be clearly seen in FIG. 2, a reel of this film material is pivotally mounted at 5 on a bench 6 located opposite the entrance to the conveying system 2. The film 4 is unwound from a pair of metering rollers 7 driven by an electric motor 8 which feeds said film with the same linear speed characteristics as the conveying system 2. A jockey roller 9 makes it possible to compensate for accelerations and decelerations of the stepwise movement of the conveying system 2, while the guide rollers 10 accompany the film 4 as far as work station I (see FIG. 3), where it completely covers the moulds 1. In this zone the film 4 is taken up by a respective conveying system 11 which, gripping it laterally, ensures correct transportation thereof at the same rate as the conveying system 2, through the various work stations of the plant, until packaging has been completed (see FIG. 5).

In station I (FIG. 3), as mentioned, the stages of lining of the moulds 1 with the film 4 and filling of the moulds thus pre-lined are performed. For this purpose said station comprises a radiating-panel heater 12 mounted slidably on a slide 13 arranged transversely with respect to the conveying system 2, so as to move between a working position, where the heater is positioned above the moulds 1, and a rest position; the heater 12 is automatically moved rapidly into this latter position in the event of non-programmed stoppages of the conveying system 2, so as to prevent overheating or burning of the film 4. In the longitudinal direction, the heater 12 extends so as to cover one or more working positions, in which therefore the film 4, stretched over the moulds 1, is heated to a temperature sufficient to allow the desired degree of deformability thereof and hence the subsequent vacuum-forming to be achieved.

Figure 3:
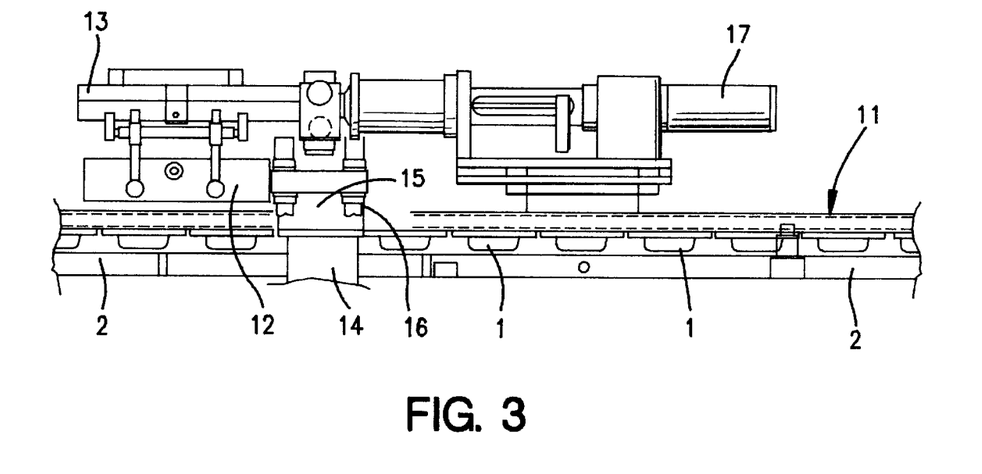
FIG. 3 is a side elevation view illustrating the device for lining the moulds with the first film, and for filling them.

In order to ensure homogeneous thermoforming and at the same time to avoid the formation of folds in the lining film at the edges of the mould, the heating resistances of the heater are arranged closely next to one another, but following the pattern of the moulds, i.e., in particular, so as to cover entirely only the tray zone of each mould, in order to perform homogenous heating thereof, avoiding however heating the film which covers the external edge of the moulds and the joining zones between adjacent moulds. These non-heated zones of the film retain their mechanical strength and prevent the entire film from sagging dangerously during the heating operation.

If very thin lining films are used, a screen is preferably incorporated in the device for heating the film, said screen being arranged between the heater and the lining film and being provided with apertures having the same pattern as that of the resistances on the heater. The screen is temperature-regulated by means of an internally flowing fluid, having a temperature sufficiently higher than the room temperature, for example a temperature of 60°. In this way the zones of the film protected by the screen retain almost entirely their mechanical characteristics and however have a moderate capability of being deformed, sufficient to withstand, without the formation of flaws or folds, thermoforming of the neighbouring heated zones.

Said thermoforming operation takes places in the first working position downstream of the heater 12, where linear actuators (not shown) are designed to displace a lower plate 14 and an upper counter-plate 15, until they are brought into mutual contact with the arrangement, in between, of the external edge of one or more moulds 1 and the film 4. In this position, a sealed chamber 16 is formed between the two plates 14 and 15, inside which the bottom part of the moulds 1 is enclosed. At this point, the chamber 16 is connected to a vacuum source so that the film 4, which has been made suitably deformable by the action of the heater 12, is sucked against the walls of the moulds 1 through the holes formed therein, adhering perfectly thereto.

As soon as the film 4 has adhered to the surface of the moulds 1 as a result of the vacuum created in the sealed chamber 16, the stage involving filling of the moulds 1 is started. It must be pointed out in this connection that, in order to allow subsequent perfect sealing of the edges of the film covering the portions of adhesive contained in the moulds, it is essential that said edges under no circumstances become soiled with adhesive. Moreover, in order to reduce to a minimum the mechanical shear action which the melted adhesive jet may exert on the film 4, it is indispensable that this jet should consist of a gentle flow, with no spattering, directed perpendicularly with respect to the bottom of the moulds 1.

The device for metering the melted adhesive will therefore be chosen from among those volumetric devices able to obtain the emission of volumes of melted material which are perfectly controlled and constant over time (i.e. precisely the volume contained in the moulds) and which are totally devoid of air and gas, while the distribution nozzles will have a configuration able to ensure a perfectly regular flow and will be equipped with obturator devices able to eliminate completely the formation of any droplets or strands of material at the end of each casting operation. The aforementioned requirements therefore make it unadvisable to use multiple-nozzle injectors, since it certainly would not be possible, in view of the high viscosity of the materials treated, to obtain a perfectly uniform and regular distribution of the flow among the individual nozzles.

In view of the impossibility of finding on the market a metering device which has the aforementioned characteristics at the high temperatures required for handling of the melted adhesives (up to 180° C.) and at the pressures (up to 4 atm) able to provide a high filling speed for very viscous products, as is indispensable for ensuring a high productivity of the process, the inventor of the process described herein has studied and developed a special, forced, multiple metering device, which will be described below.

Figure 4:
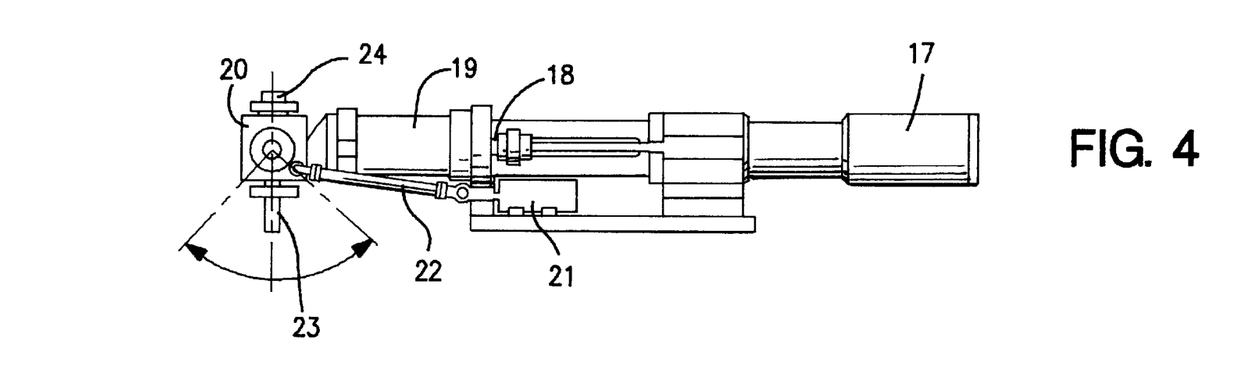
FIG. 4 is a side elevation view on a larger scale and in greater detail of the sole device for filling the moulds and metering the adhesives in the melted state.

This device, which can be seen in the FIG. 3 and in greater detail in FIG. 4, comprises a hydraulic cylinder 17 which simultaneously and directly controls the stroke of several pistons 18 of corresponding single-acting volumetric pumps 19, the inlet/outlet port of which is connected to distribution units 20 each provided with a three-way valve, all said valves being actuated simultaneously by a pneumatic cylinder 21 via connecting rods 22. During the forwards stroke of the pistons 18, the three-way valves are set so as to connect the port of the pumps 19 to the nozzles 23 arranged above corresponding moulds 1. During the return stroke of the pistons 18, the three-way valves are set instead so as to connect the port of the pumps 19 to the loading inlets 24 of the distribution units 20 which are connected to a system for supplying the melted adhesive, known per se and not illustrated here. The three-way valves of the distribution units 20 may be of any type, known per se, for example of the ball, obturator or slide type, etc., provided that they ensure correct and extremely precise operation, i.e. with no leakages and no risk of seizing, up to temperatures of 200° C. and up to a viscosity of 100,000 mPa/s. Finally, it will be noted that the volume of adhesive material loaded by the pumps during each working cycle can be regulated as required, by simply varying, obviously within the design limits, the stroke of the hydraulic cylinder 17 and consequently that of the pistons 18.

From the above description of work station I, it should be quite clear that the first film 4 of non-sticky plastic material is not cut by the plate 15, but simply pressed against the external edge of the moulds 1 for the time strictly necessary to perform the mould thermoforming and filling operations. At the end of these operations the plates 14 and 15 are moved away from the moulds 1 soon after filling, leaving them free to continue towards the next working positions.

The moulds 1, filled with adhesive material in the manner described above, move forward along the conveying system 2 through the work station II which is long enough to allow a reduction in the surface temperature of the portions of melted adhesive, suitable for ensuring substantial stabilization of the free surface thereof, such that the moulds can be covered with a second covering film. It is important to emphasize in this connection that it is by no means necessary, in order to carry out this operation, for the portions of adhesive material to be entirely or partly solidified; in fact, it is sufficient for the free surface of the adhesive material to have stabilized, i.e. to have reached a temperature low enough not to cause melting of the second covering film and also a degree of viscosity high enough to be substantially coherent and hence not give rise to the formation of small undulations, spatters or drips during the covering stage. From the experience gained by the inventor it has emerged that the normal ambient conditions are sufficient to ensure correct cooling of the cast adhesive, where there is the possibility of having a cooling section II of adequate length. However, in order to avoid excessive elongation of said work station, it is possible to increase the cooling speed by means of forced ventilation, again using the ambient air. However, there are no negative effects on the present process if the length of this section of the packaging plant is further reduced by adopting other types of cooling system, using cold water or air, of the type widely known, should lack of space or other particular considerations justify the increased operating cost thereof, to the detriment, obviously, of an increase in energy consumption.

It is particularly important to stress that any form of forced cooling is limited to work station II, for the purposes of reducing its length, while no other type of cooling is necessary during the extremely delicate phase of filling of the moulds performed in work station I.

Figure 5:
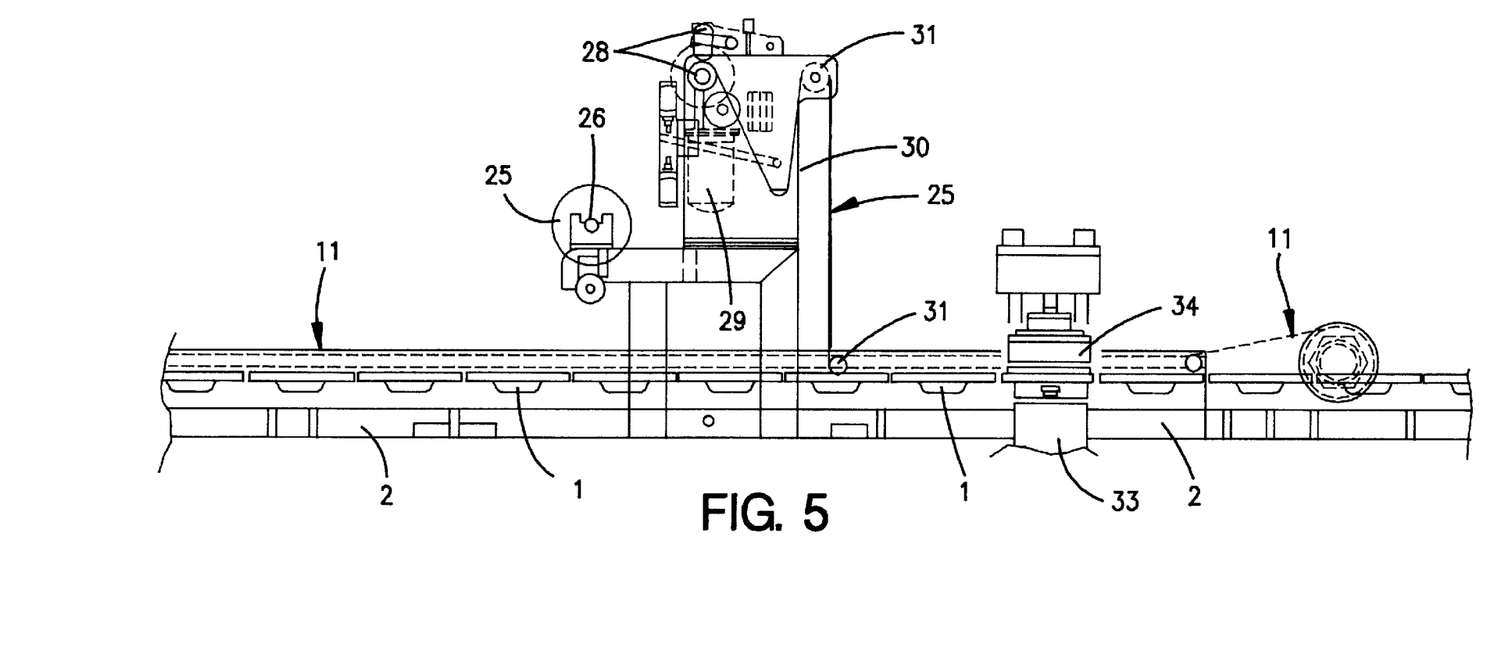
FIG. 5 is a side elevation view which illustrates the device for covering the moulds with the second film, and the device for bonding the latter to the first film.

Covering of the moulds 1 with the second film and bonding of the latter to the first film, along the edges of each individual mould, takes place in work station III, illustrated in detail in FIG. 5. Similarly to that which has been seen previously for the first film 4, in this work station the second film 25, which is the same as or different from the first film 4, is supplied to the plant from a reel of such material pivotably mounted at 26 on a bench 27 located above the conveying system 2. The film 25 is unwound from a pair of metering rollers 28 driven by an electric motor 29 which feeds said film with the same linear speed characteristics as the conveying system 2. A jockey roller 30 makes it possible to compensate for accelerations and decelerations of the stepwise movement of the conveying system 2, while guide rollers 31 accompany the film 25 so that it is positioned horizontally just above the upper surface of the moulds 1.

The moulds 1 thus covered reach a working position where there are linear actuators (not shown) which, in a manner entirely similar to that already described with regard to the work station I, press together the films 4 and 25, along the edges of each individual mould, between a bottom plate 33 and a heat-sealing device 34. In this position, the heat-sealing device 34 is activated so as to join together said first and second films in a perfectly stable and continuous manner, thus preventing any possible future leakages of adhesive material between said films.

It will be noted in this connection that the greater utility of the conveying system 11 does not lie so much in the actual feeding of the film 4, which could also be equally well fed by the same conveying system 2 once some moulds 1 have been filled with adhesive and hence can provide enough anchorage to overcome the small amount of friction during unwinding of said film. The advantage of this conveying system lies instead in the fact that the film 4 is kept perfectly stretched by it, independently of the shrinkage forces which occur in the film as a result of the thermoforming operation and the heat of the melted adhesive, thus making possible perfect heat-sealing with the film 25 so that it fits perfectly with the film 4 along the entire perimeter of the moulds. It is important to emphasize how, by using the measures described above, it is possible to perform an extremely precise bond, i.e. very close to the portion of adhesive. In this way it is therefore possible to perform the successive operations involving cutting of the excess edges of the films, so as to leave a sealed flange of fairly limited width, which represents an important advantage when the time comes to use the adhesive product; wide sealing flanges may in fact melt prematurely upon coming into contact with the walls of the melting devices and degrade there without being able to mix any longer with the adhesive product, thus creating quite a few problems at the time of application.

Figure 6:
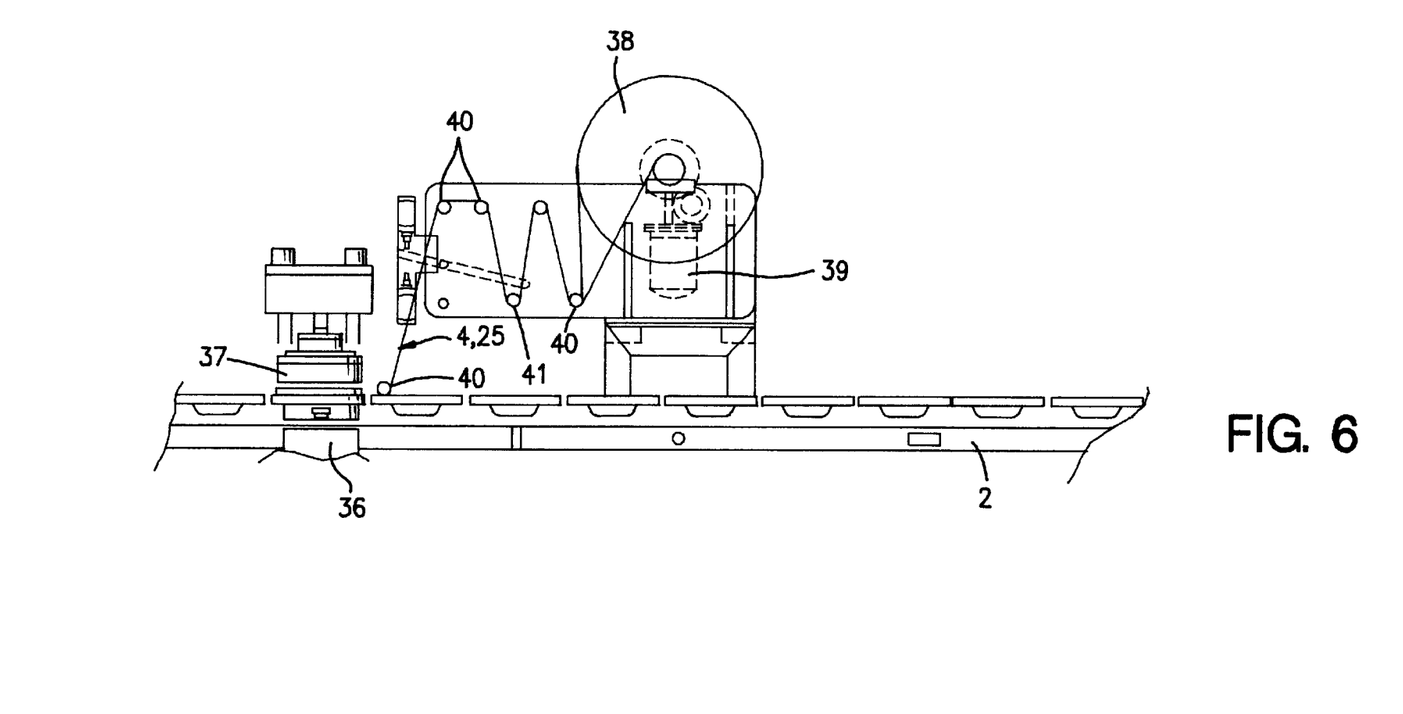
FIG. 6 is a side elevation view illustrating the device for cutting the films and recovering the non-used part thereof.

The moulds 1 containing the portions of adhesive, now perfectly sealed, therefore continue their stepwise movement as far as the last station IV, illustrated in FIG. 6, where simultaneous cutting of the films 4 and 25 is performed and the parts of these films which have not been used are rewound. In a manner similar to that considered for the preceding work stations, linear actuators (not shown) raise a counter plate 36 up against the external edge of the moulds and lower a set of cutters 37, allowing cutting of the films 4 and 25 in their mutual sealing zone, which can thus be provided with the desired small width. Other cutting systems known in this branch of the art, however, may be used.

The non-used parts of the films 4 and 25 (in practice the dead zones between the moulds 1) are rewound together onto a reel 38 for collecting excess material, which is driven by a motor 39, after passing through guide rollers 40 and a jockey roller 41. The non-sticky plastic material collected on the reel 27 is absolutely devoid of any trace of adhesive material, thanks to the special procedures described above for the filling and covering devices, and can then be sent to the manufacturers of this material, where it can be re-used in its entirety.

Covering of the free surface of the moulds 1, as an alternative to that carried out with a second film of non-sticky material, described above in detail, can also be performed by superimposing two partially covered portions along the walls of the moulds, so that the free mutual surfaces mate and by then heat-sealing the free edges of the two films thus superimposed. This result can obviously be achieved in different ways, both manually and with varying degrees of automation. For example, it can be envisaged, at a point close to the exit of the conveying system 2, in alternate working positions, upturning a mould onto the preceding mould and then performing the sealing operation. In another embodiment, particularly suitable when it is required to perform production on a large scale, it is possible to envisage two production lines facing each other and the superimposing of pairs of portions can thus be easily performed in the zone where the two facing conveying systems make contact with each other. In many of these applications it will obviously be necessary for the portions of adhesive to have solidified sufficiently so as to allow more or less complete removal from the mould during combining of the two portions. Finally, other non-sticky materials, of varying types known in the art and referred to in the introductory part of the present invention, may be used in order to cover the free surface of the portions of adhesive formed in the moulds 1, thus also achieving in this way the aims of the present invention.

In the embodiment illustrated and described, the overall length of the conveying system 2 is calculated such that when the moulds 1 reach the end of said system, freeing for example by means of overturning, the sealed portions of adhesive, the adhesive itself has already adequately cooled so that the shape of said portions remains substantially integral, thereby facilitating the subsequent operations of packing in boxes and storage.

According to another embodiment of the plant described above—particulary suitable for use with adhesives which have a low viscosity and melting temperature, requiring very long cooling times—upon reaching the end of the conveying system 2 the sealed portions of adhesive are not extracted from the moulds 1, but instead are kept inside them along the return section of the conveying system 2, so as to double the cooling time of the portions while maintaining the same length of said conveying system. In this case, obviously, unloading of the moulds 1 will take place in the vicinity of the entrance point E of the conveying system instead of at the exit point U, as was the case in the embodiment illustrated in the drawings.

From the description provided above it will have been possible to note how the process according to the present invention has fully achieved the aims preset. Thanks to the special procedures for forming the covering layer it is in fact possible to use covering films which are very thin and dissolve rapidly. Owing to the special operating mode of the injector device it is possible to form in extremely short time periods, and hence at a high production rate, portions of adhesive of entirely uniform weight, avoiding, moreover, any mechanical shear action on the covering film and any possibility of soiling the edge of the moulds. This latter feature also enables heat-seals of excellent quality to be performed, keeping them moreover fairly small in size, with all the advantages as regards efficiency of use. The quality of the heat-seals is also particularly good owing to the fact that this operation is performed separately from the cutting operation, thus avoiding any interference between the two processes and with enough time to perform a heat-seal at lower temperatures which avoids any risk of burning or perforation of the films.

The process, finally, enables a fairly high production rate to be achieved, in both absolute and relative terms, since the plant is extremely reliable and hence substantially devoid of any type of problem which can result in interruption of processing. The process which is subject of the present invention ensures moreover a good degree of production flexibility. In fact, depending on the manufacturer's requirements, the productivity of the machine can be reduced or increased within a wide range of values.

The shape of the moulds can also be varied with ease, without having to modify any part of the machine, provided that the perimetral dimensions of the moulds are maintained. Otherwise, it is sufficient to change, in addition to the moulds, merely the heat-sealing device and the cutters, while obviously always respecting the "pitch" of the moulds, i.e. their dimensional value in the longitudinal direction of the machine.

This high level of productivity can be further increased, during the design stage, in various ways: by increasing the dimensions of the moulds; by increasing the speed of the conveying system and at the same time increasing either the length of the machine or the intensity of forced cooling; by increasing the number of moulds in each work station; or also by doubling up the first work station so that the operations of mould lining and filling are performed simultaneously on different moulds and not, as in the plant described above, in succession on the same mould.

It will be noted, finally, that the process and the plant described above are not limited in any way to the adhesive products to which almost exclusive reference has been made in this specification for the sake of convenience. This process and this plant can in fact be used for entirely different products, for example in the sector of foodstuffs or detergents or chemical products in general, by simply suitably varying the nature of the non-sticky film and the covering material, so that they are always perfectly compatible with the packaged material and can be rapidly dissolved therein when the latter is melted or dissolved/ suspended in whatever solvent medium.

The process according to the present invention has been described with particular reference to a preferred plant for implementation thereof, but it is obvious that the same process can be carried out in completely different plants, provided that they possess the fundamental characteristic features of the present invention, as defined in the accompanying claims.

I claim:

1. Process for packaging in the fluid state adhesive substances, which are sticky at room or handling temperature, wherein the substance is cast in a tray-mould (1) lined beforehand with a film (4) of plastic material which is non-sticky at the room temperature and compatible in the fluid state with the substance itself, comprising the following stages:

a) providing at least one mould (1) for casting the substance in the fluid state, having a plurality of through-holes passing through at least part of its walls;

b) rapidly lining the internal walls of said mould with a first thin and easy deformable film (4) of said non-sticky plastic material, causing it to adhere perfectly to the walls of the mould by means of a vacuum exerted on the outside of the mould or pressure on the inside thereof;

c) introducing, under pressure and with a gentle flow into the mould thus lined, a predetermined quantity of substance in the fluid state, without performing any cooling of the mould;

d) allowing cooling of the free surface of the cast substance, until stabilisation of said surface is obtained;

e) covering the filled mould with a non-sticky material (25) compatible in the fluid state with the substance;

f) bonding said non-sticky material (25) to said film (4).

2. Packaging process according to claim 1, wherein, prior to the stage b), said film (4) of non-sticky plastic material is heated until the desired degree of deformability is achieved.

3. Process according to claim 2), wherein said heating is selectively performed in correspondence of said mould (1) and its edges.

4. Packaging process according to claim 1, wherein said non-sticky material used in stage e) consists of a second film (25) of non-sticky plastic material, and said process comprises the following additional stages:

f) heat-sealing said first and said second film (4,25) at the edges of the mould (4);

g) cutting the sealed films in the sealing zone;

h) extracting from the mould the portion of adhesive thus packaged and storing it until it has cooled completely.

5. Process according to claim 1, wherein said non-sticky material used in stage e) consists of a second partially covered portion of adhesive, as obtained at the end of stage d), arranged on the first portion so as to superimpose the respective free surfaces, after extracting from the mould (1), where necessary, one of said portions, and said process comprises the following additional stages:

f) heat-sealing the films (4) of said pair of superimposed portions along the peripheral line of the free facing surfaces thereof;

g) cutting the sealed films in the sealing zone;

h) extracting the double portion of adhesive thus packaged and storing it until it has cooled completely.

6. Process according to claim 1, performed continuously and stepwise on successive rows, consisting of several moulds (1) arranged alongside each other, mounted on a conveying system.

7. Process according to claim 1, wherein the mould (1) used in stage a) of the process is a mould which is provided with a set of small holes closely arranged and uniformly distributed on its bottom wall, and which has no sharp edges.

8. Process according to claim 7), wherein said mould (1) is made of metallic material.

9. Process according to claim 8), wherein said metallic material has undergone a surface treatment with a non-adherent material.

10. Process according to claim 7), wherein said mould (1) has a negligible thermal mass.

11. Process according to claim 7), wherein said mould (1) walls have a thickness not greater than 5 mm and even more preferably not greater than 3 mm.

12. Process according to claim 7), wherein said mould (1) has a depth greater than $\frac{1}{5}$th and less than $\frac{1}{3}$rd of the smaller side thereof.

13. Process according to claim 1), wherein said films (4,25) of non-sticky material used in stages b) and e) of the process have a thickness less than 60 $\mu$m and preferably less than 40 $\mu$m.

14. Process according to claim 1), wherein said films (4,25) of non-sticky material used in stages b) and e) of the process have characteristics of rapid dissolvability in the fluid substance.

15. Process according to claim 1), wherein stage c) of the process is performed by means of a pressure metering device of the volumetric type.

16. Process according to claim 15), wherein said metering device consists of several volumetric pumps (19) with single-acting pistons (18), arranged alongside one another in the same number as the number of moulds (1) in one of said rows of moulds, said pistons (18) being rigidly operated simultaneously by a single pneumatic cylinder (17).

17. Process according to claim 1), wherein stage d) of the process is performed by means of forced cooling with air at room temperature, cooled air or water.

18. Process according to claim 1), wherein the non-used part of said non-sticky films (4,25) used in stages b) and e), after the cutting operation of stage g), is recovered and sent for recycling.

19. Process according to claim 1), wherein said substance is an Hot Melt Pressure Sensitive Adhesive (HMPSA).

20. Plant for packaging in the fluid state adhesive substances, which are sticky at room or handling temperature, wherein the substance is cast in a tray-mould (1) previously lined with a film (4) of plastic material, which is non-sticky at the room temperature and compatible in the fluid state with the substance itself, the filled mould is then covered with a non-sticky material (25), compatible in the fluid state with the substance, and finally the two non-sticky materials (4,25) are reciprocally bonded characterised in that it comprises a plurality of casting moulds (1), each having a plurality of through-holes which pass through at least part of the walls thereof and being arranged on parallel lines of a conveying system (2) designed to move said moulds, in successive steps, through: a first station (I) for lining the internal walls of the moulds with a perfectly adherent layer of said film (4) of non-sticky plastic material, by means of a vacuum exerted on the outside of the mould or a pressure on the inside thereof, and for filling the moulds (1) by introducing therein, under pressure and with a gentle flow, a predetermined quantity of said substance; a second station (II) for cooling the free surface of the filled moulds; a third station (III) for covering the moulds with said non-sticky material (25) and for bonding said material to said film (4); and a fourth station for cutting said non-sticky film (4) and material (25) bonded to one another.

21. Plant according to claim 20), wherein said station (I) for lining the moulds comprises a heater (12) heating the lining film (4) for subsequent thermoforming thereof, in which the heating resistances of the heater are arranged in a pattern so as to cover entirely and solely the surface of the trays of said moulds (1).

22. Plant according to claim 21), comprising moreover a screen arranged between said heater and the lining film, said screen having apertures corresponding to said heating resistances and being kept at a constant temperature higher than the room temperature.

23. Plant according to claim 20), wherein each of said moulds (1) is provided with a plurality of small holes closely arranged and uniformly distributed on its bottom wall and has no sharp edges.

24. Plant according to claim 23), wherein said mould (1) is made of metallic material.

25. Plant according to claim 24), wherein said metallic material has undergone a surface treatment with a non-adherent material.

26. Plant according to claim 23), wherein said mould (1) has a negligible thermal mass.

27. Plant according to claim 23), wherein said mould (1) has walls having a thickness not greater than 5 mm and even more preferably not greater than 3 mm.

28. Plant according to claim 23), wherein said mould (1) as a depth greater than ⅕th and less than ⅓rd of the smaller side thereof.

29. Plant according to claim 20), wherein said film (4) of non-sticky material used in the first work station (I) has a thickness of less than 60 $\mu$m and preferably less than 40 $\mu$m.

30. Plant according to claim 20), wherein said film (4) of non-sticky material used in the first work station (I) has moreover characteristics of rapid dissolvability in the fluid substance.

31. Plant according to claim 20), wherein filling of the mould in said first work station (I) is performed by means of a pressure metering device of the volumetric type.

32. Plant according to claim 31), wherein said metering device consists of several volumetric pumps (19) with single-acting pistons (18), arranged alongside one another in a number equal to that of the moulds (1) in one of said rows of moulds, said pistons being rigidly operated simultaneously by a single pneumatic cylinder (17).

33. Plant according to claim 20), wherein said second station (II) comprises a system for forced cooling of the filled moulds (1), using air at the room temperature, cooled air or water.

34. Plant according to claim 20), wherein the non-sticky material (25) used in said third work station (III) is a film according to claims 29) and 30) or the non-covered side of a second portion of adhesive already partially covered by a non-sticky film.

35. Plant according to claim 20), wherein the bonding of said film (4) and said non-sticky material (25) in said third work station (III) is performed by compressing the film and the material between a movable counter plate and a movable heat-sealing device.

36. Plant according to claim 20), wherein the cutting of said film (4) and said material (25) in said fourth work station is performed by compressing the film and the material in the mutual sealing zone between a movable counter plate and a movable cutting device.

37. Plant according to claim 20), wherein said cutting station (III) comprises moreover a device for rewinding the non-used part of said film (4) and said non-sticky material (25).

* * * * *